(12) United States Patent
Adachi

(10) Patent No.: US 6,403,179 B1
(45) Date of Patent: Jun. 11, 2002

(54) FIBERGLASS BOOM AND METHOD OF MAKING SAME

(76) Inventor: Yutaka Jeff Adachi, 77 Saskatoon Drive, Toronto, Ontario (CA), M9P 2G1

(*) Notice: Subject to any disclaimer, the term of this patent is extended or adjusted under 35 U.S.C. 154(b) by 89 days.

(21) Appl. No.: 09/609,333

(22) Filed: Jun. 30, 2000

(51) Int. Cl.$^7$ ................................................. B32B 1/08
(52) U.S. Cl. .................... 428/36.3; 428/36.91; 156/173
(58) Field of Search ............................ 428/36.3, 36.91; 156/173, 169; 52/736.3, 737.6, 738.1; 138/144

(56) References Cited

U.S. PATENT DOCUMENTS

| | | |
|---|---|---|
| 5,238,716 A | 8/1993 | Adachi |
| 5,505,030 A | 4/1996 | Michalcewiz et al. |
| 5,549,947 A | 8/1996 | Quigley et al. |
| 5,688,571 A | 11/1997 | Quigley et al. |
| 5,928,736 A | 7/1999 | Parekh |

Primary Examiner—Alexander S. Thomas
(74) Attorney, Agent, or Firm—Marks & Clerk

(57) ABSTRACT

A polygonal composite structure is formed using a filament winding process. The composite structure formed on a mandrel having a longitudinal axis, comprises an inner structural layer, an outer structural layer, and a plurality of corner pieces. The inner and outer structural layers are formed by winding a fibre reinforcement material, having a resin applied thereon, about a mandrel. The fibre reinforcement material is oriented at a winding angle relative to the longitudinal axis. Each of the plurality of corner pieces is located at each corner of the polygonal structure between the inner structural layer and the outer structural layer. Each of the plurality of corner pieces is oriented lengthwise along the length of the structure. The number of corner pieces is equivalent to the number of sides of the structure.

19 Claims, 3 Drawing Sheets

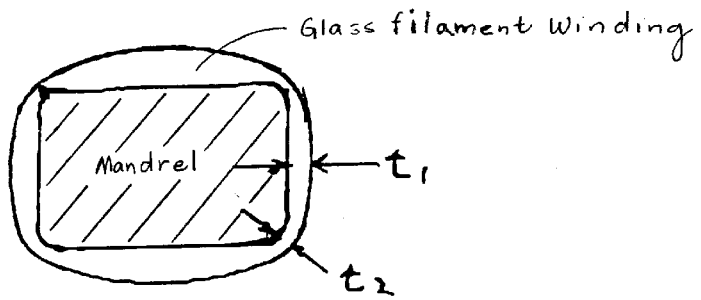
FIG. 1 - Prior Art
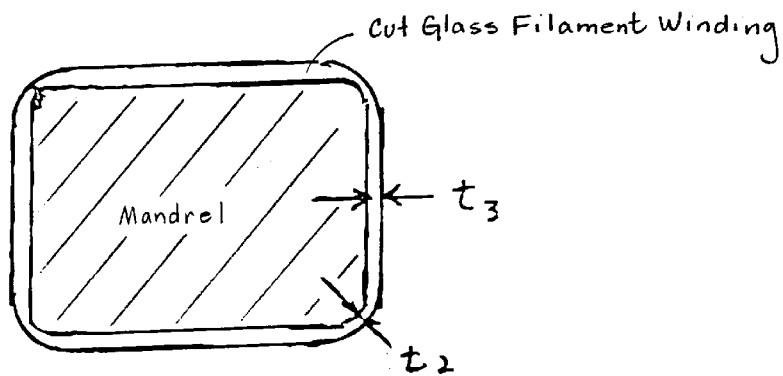
FIG. 2 - Prior Art
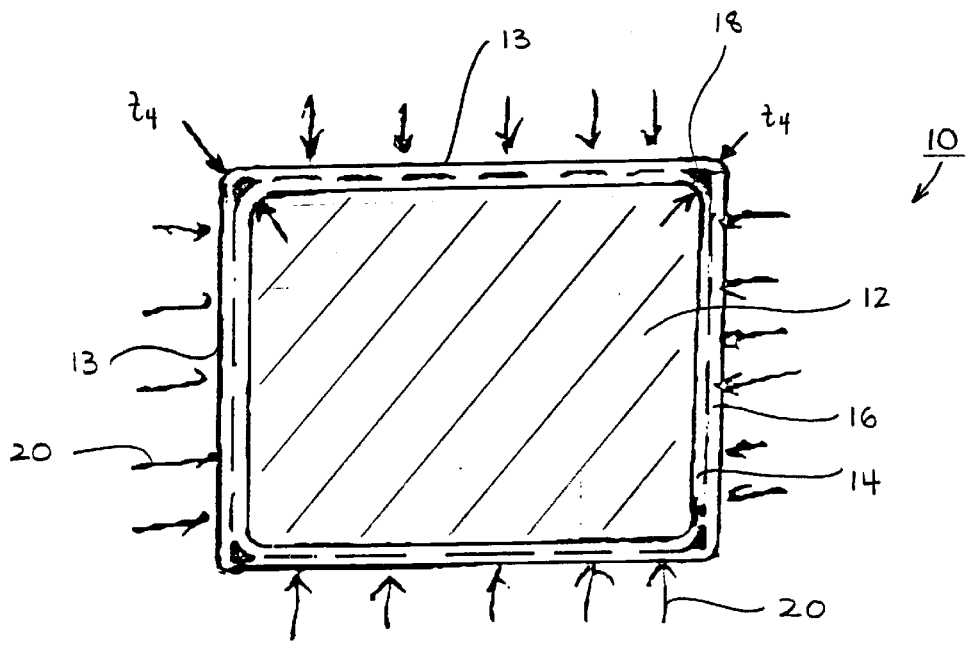
FIG. 3

FIBERGLASS BOOM AND METHOD OF MAKING SAME

FIELD OF THE INVENTION

This invention relates to the fabrication of composite structures, and more particularly to the fabrication of hollow structures having non-circular cross sections.

BACKGROUND OF THE INVENTION

Composite materials are widely used in the field of structural applications. Further, nonconducting composite beams have found particular use in boom trucks—trucks that are used to lift a bucket or similar structure containing a person and/or machinery to an elevated position. Typically trucks of this variety are used for building maintenance, repair/installation of high voltage wires, and similar activities. For such uses and many others, the beam must be capable of withstanding considerable loads and stresses. Also, when used as a boom for high voltage repair and/or installation, the beam must have a high degree in dielectric properties, such that the beam is able to withstand a very high voltage while allowing a very low electric current to pass therethrough.

The filament winding process is often employed in the manufacture of composite beams. In addition, it is often desirable to make rectangular shaped beams—typically, square beams—as well as other forms having flat as opposed to rounded sides. In a typical winding operation, a mandrel of the desired shape of the end resulting beam is utilized. A bundle of fibres, generally impregnated with a resin, are wound along the length of the mandrel in a pattern dictated by the winding angle, which is the angle the fibre makes with the longitudinal axis of the mandrel. This angle is, in turn, dictated by the structural requirements of the end product.

Once the desired thickness for the beam walls is achieved, the mandrel overwound with the composite material is left to cure at room temperature—or in some cases at an elevated temperature depending on the resin. Once cured, the mandrel is removed, and the composite beam structure is ready for use. However, the rectangular tubes made from conventional filament winding process have disadvantages compared with round tubes made from the same process.

In the case of round tube winding, the tension force developed in the resin-impregnated fibres during the winding process maintains a uniform radial pressure on the surface of the tube. As the tension force increases, more radial pressure develops, which squeezes the resin out; and that results in a higher fibre content in the finished laminate. The fibre content in the filament wound round tube can be controlled uniformly throughout the laminate. Fibre content is defined as the percentage of fibre by weight as measured in the cured composite beam. In addition, the wall thickness will be consistent as a result of the uniform radial pressure.

However, in rectangular tube winding, the tangential force arising from the fibre tension against the flat surface is much smaller than in the case of a round tube. Furthermore, the pressure does not develop uniformly. At each corner of a rectangular tube, there will be a higher radial pressure. This uneven distribution of pressure creates an uneven fibre content and inconsistent wall thickness. A normal rectangular filament wound beam typically has rounded corners and exhibits a greater wall thickness toward the central portion of the wall on each side of the rectangle, and a much smaller wall thickness towards the corners. A great many remedies have been explored in an attempt to achieve uniform wall thickness.

In the past, generally speaking, there have been two methods to control the external dimensions of a rectangular beam. First, by grinding the crown down to a flattened state, or second, by pressing the crown down to a flattened state in the curing process. Each method encounters the problem of losing strength due to the cutting of continuous fibres and/or the loosening of the tension that was created in the fibres through the winding process. In each case, the final product has a large corner radius with a thinner wall thickness at each of the corners.

The difficulty associated with inconsistent wall thickness is how that inconsistency affects the beam strength. In beams, especially those used as booms such that they act in essence as a cantilever beam, it is important to ensure high bending strength. In turn, it is also important that the beams have a relatively high shear strength. The required strength of each beam will change depending on the intended end use. In turn, the overall strength may be varied by adjusting the winding angle.

In general, when a beam is supported at least at one end and a load is applied to the other end, it bends. In this simple cantilever bending the beam experiences various types of stresses, their extent depending on the location in the beam. The most critical points in the beam are the bottommost corner points. At these points, compressive stress combined with shear stress is at a maximum in the beam. Thus, the strength at these corners is very important, more so than other areas in the beam. If the wall thickness is thinner at these points, higher stresses develop and may result in failure at early stages of loading. In addition, the wall thickness at these corners influences the beam stability against elastic buckling of the bottom wall which is subject to a compressive stress.

There is a need for an improved approach to the fabrication of a composite structure having a non-circular cross section.

DESCRIPTION OF THE PRIOR ART

U.S. Pat. No. 5,238,716 issued to Adachi teaches a composite beam having a hollow cross-section. The beam is made of three distinct structural layers. An inner structural layer comprises a glass filament winding, a middle structural layer comprises four plates placed around the inner structural layer, and an outer structural layer comprises layers of woven and nonwoven fibre material. Each of the inner and outer structural layers have been saturated with resin. Pressure is applied to the second structural layer to remove all entrapped air. The beam has very high compressive and tensile strength. The difficulty in manufacturing such a beam is the requirement for three separate processes to form the three distinct structural layers, making the procedure time consuming and costly.

U.S. Pat. No. 5,505,030 issued to Michalcewiz et al teaches a composite reinforced structure. The reinforced load supporting structure has an inner load supporting structure and an outer exo-skeleton. The inner load supporting structure, typically a column or beam, is enclosed by a layer of at least one distinct piece of preformed engineering material having both a high tensile strength and high modulus of elasticity which forms the exo-skeleton. The exo-skeleton is used to reinforce the load supporting structure and reinforce areas that typically suffer from cracking. An adhesive substance adheres each of the layers (when there is more than one) of the exo-skeleton to the next. The invention allows for reinforcement of generally any size or shape of object. However, the increase in tensile strength of the beam is derived only from the outer exo-skeleton applied to the inner load supporting structure.

U.S. Pat. No. 5,549,947 issued to Quigley et al teaches both the structure and manufacture of a composite shaft. The composite member has a plurality of plies; an interior ply functioning to dampen sudden forces; an intermediate ply functioning as a load carrier; and an exterior ply being abrasion resistant. At least one of the plies has a biaxial or triaxially braided fibre geometry, where one or more of the fibres are helically wound about the circumference of the composite member. The total bending stiffness of the composite member is divided amongst the three plies. The second ply has a share of the bending stiffness that is greater than either of the first or third plies shares. The present invention is intended primarily for tubular shafts and provides a light weight, high strength composite member.

U.S. Pat. No. 5,688,571 issued to Quigley et al is a continuation in part of the previously described patent. This patent teaches a tubular member having a plurality of plies and a method of fabricating and incorporating side by side closed tubes, typically having a circular or rectangular cross-section. The composite member is generally formed by a continuous sheet of fabric. Elongated strips of fabric are formed into side by side closed tubes. A ply of axially extending fibres is then disposed over the tubes. The fabric is generally a preformed fabric, preferably nonwoven. A resin is applied to the plies of fabric, and the resulting composite structure is cured.

U.S. Pat. No. 5,928,736 issued to Parekh teaches a composite structure having an integrated aperture, and a method for its preparation. The composite structure is fabricated by providing a mandrel having a winding surface and a shaped plug placed into the winding surface such that it extends outwardly. An uncured composite material is wound about the winding surface typical of the filament winding process. The addition of a shaped plug provides a means to avoid any cutting or machining that may be required in order to form an aperture therein. In the winding process, the fibre is wound about the mandrel and around the shaped plug such that the fibres are clustered around the edges of the plug. The cluster of fibres results in an increase in strength in the thickened region around the periphery of the aperture.

SUMMARY OF THE INVENTION

In accordance with one aspect of the present invention, there is provided a polygonal composite structure formed on a mandrel having a longitudinal axis running lengthwise along the composite structure. The composite structure having two structural layers, and a plurality of corner pieces equal to the number of sides of the composite structure. Each of the plurality of the corner pieces is oriented lengthwise along the polygonal composite structure and is located at each corner of the polygonal composite structure. A corner is defined by the intersection of adjacent sides of the composite structure. The two structural layers comprise an inner structural layer and an outer structural layer each formed by winding a fibre reinforcement material about the mandrel. The fibre reinforcement material has a resin applied thereon and is wound about the mandrel at a winding angle relative to the longitudinal axis of the mandrel. The resin is selected from the group consisting of epoxy, polyester, vinylester resin, and combinations thereof. The fibre reinforcement is selected from the group consisting of glass fibre, carbon fibre, synthetic fibres, and combinations thereof. Each of the plurality of corner pieces is located between the inner structural layer and outer structural layer such that the placement of the corner pieces actually defines the two structural layers at each corer. When in place, the corner pieces define the shape of each corner. On winding of the fibre reinforcement material about the mandrel, placement of the corner pieces enables the forming of a sharper corner and enables a more even wall thickness. The geometric shape of the mandrel further defines the geometric shape of the composite structure formed on the winding of the fibre reinforcement material about the mandrel. The geometric shape of the mandrel represents the desired resultant shape of the composite structure.

The fibre reinforcement material forming a composite structure is at least a single band of fibre. This single band is formed from two or more thinner strands of fibre which are intertwined together and impregnated by a resin. Typically, multiple strands are used to form a band of filament and that band is impregnated with resin and is then wound about the mandrel. The number of winding wraps of the band about the mandrel creates a winding pattern where the pattern is designed to cover the entire surface uniformly with the fibres.

In the first embodiment the polygonal composite structure is rectangular, however, the composite structure may also be square. Further, the shape of the composite structure is influenced by the desired structural properties. Generally, the polygonal composite structure has six or fewer sides, usually four sides.

In any event, a method of manufacture of this system in keeping with the present invention may be described in terms of a series of steps, those steps being defined as follows:

(a) The mandrel having a longitudinal axis and a winding surface, is placed in a position such that fibre reinforcement material may be wound onto the winding surface.

(b) Fibre reinforcement material having a resin applied thereon is wound about the mandrel so as to form an inner structural layer.

(c) At least one of the plurality of corner pieces is placed along an edge of the composite structure at a corner of the composite structure.

(d) A portion of the fibre reinforcement is wound about the mandrel, where the portion wound, is at least enough to hold the at least one corner piece applied in the correct position.

(e) Steps (c) and (d) are repeated until each of the plurality of the corner pieces is placed at a corner of the composite structure, such that each corner of the composite structure has a corresponding corner piece applied thereon.

(f) The fibre reinforcement material having a resin applied thereon is wound about the mandrel so as to form an outer structural layer.

(g) The composite structure is left to cure for a period of time. Each of the plurality of corner pieces applied in steps (c) and (d) is located between the inner structural layer and the outer structural layer, where the layers are defined by the placement of the corner pieces.

The method of making a composite structure may further include step (h) which would occur following step (f). The curing process described in step (g) would occur while the composite structure is in a pressure mould. Step (h) therefore being:

(h) Placing the composite structure in a pressure mould such that pressure is evenly distributed on all faces of the composite structure. The pressure mould applies an evenly distributed force such that the composite structure is compressed to predetermined dimensions. The dimensions are influenced by the desired structural strength of the composite structure.

The method of making the composite structure as described above may further include step (i) which occurs after step (g). Step (i) being:

(i) Removal of the mandrel by withdrawing the mandrel away from the composite structure.

Typically the removal of the mandrel is by pulling the mandrel away from the composite structure.

The placement of each of the plurality of corner pieces along the length of the composite structure, at each of the corners of the composite structure, is typically measured. The corner pieces generally comprise a first arm and a second arm. The joint between the first and second arms defines the corner and, in turn, an angle. The geometry of each of the corner pieces is generally determined in the initial drawings of the composite structure. The geometry is directly related to the requirements of the finished dimensions including wall thickness, corner radius, and in turn, the desired structural strength of the composite structure. The angle formed by one of the plurality of the corner pieces is equivalent to at least one of an interior angle of the mandrel. The number of interior angles of the mandrel is directly related to the geometric shape of the mandrel.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which:

FIG. 1 is a cross sectional view of a composite beam typical of the prior art;

FIG. 2 is a cross sectional view, also detailing a composite beam typical of the prior art;

FIG. 3 is a cross sectional view of a first embodiment of a polygonal composite structure of the present invention;

DETAILED DESCRIPTION OF THE PREFERRED EMBODIMENTS

Figure 4:
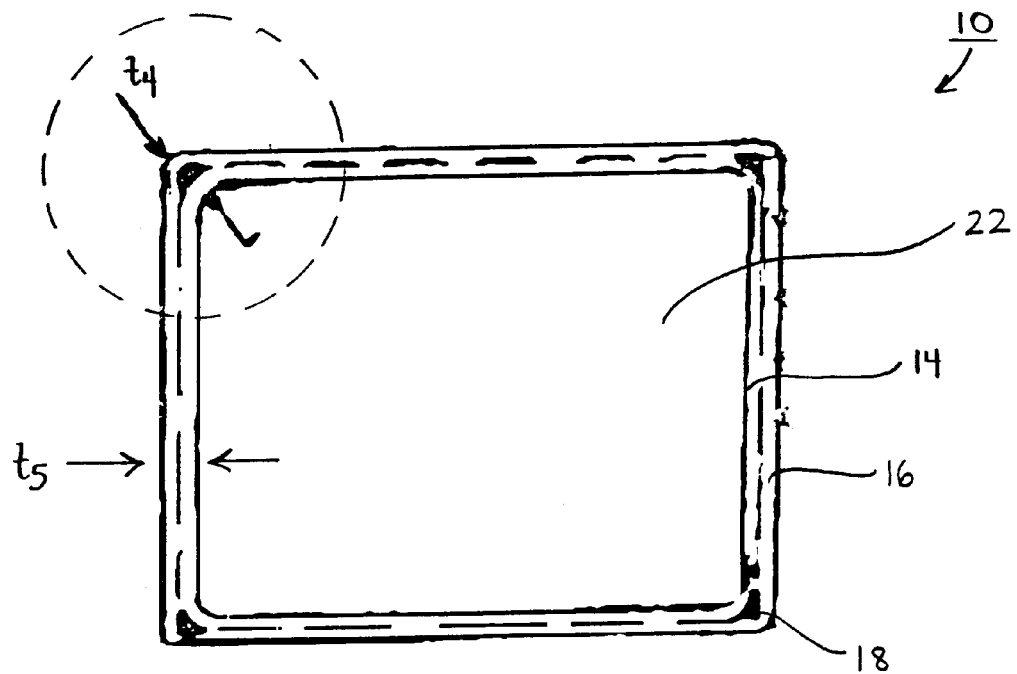
FIG. 4 is a cross sectional view of the first embodiment of a polygonal composite structure of the present invention, with the mandrel removed.

Referring now to the drawings, there is illustrated a composite polygonal composite structure, generally designated by reference numeral 10.

FIG. 1 is a cross sectional view of a composite beam typical of the prior art. In winding, a tension force develops in the fibre band during the winding process and applies a pressure onto the surface of the beam. As the tension force rises, so does the pressure developing on the beam surface. The beam as shown in FIG. 1 is formed by filament winding on a rectangular shaped mandrel. In the case of a rectangular tube, the tangential force imported by fibre tension on the flat beam surface is much smaller than the force at each corner. At the corner where there will be a higher pressure imparted to the beam, this uneven pressure creates a non-uniform fibre content and wall thickness. The resulting beam has rounded corners and the beam faces have a degree of curvature. When the mandrel is removed, it is evident that the wall thickness of the beam is not uniform. The wall thickness is greater at the central portion of each of the beam faces and smaller towards the corners of the beam. As is shown in FIG. 1, the wall thickness $t_1$ is significantly larger than at $t_2$. The lack of uniformity in wall thickness causes the stress within the composite beam to develop unevenly.

FIG. 2 exhibits the composite beam of FIG. 1 after the crowns or curvature of each of the beam faces or plate portion of the beam have been ground down to a near flattened state. In this case, the cross-sectional wall thickness $t_3$ is greater than $t_2$ and less than $t_1$. However, by grinding the plate portions of the composite beam, there is a significant decrease in the strength of the beam due to the cutting of the continuous fibres. A second method to decrease the curvature of the beam face is to compress the crown. However, in this case there is a loosening of the tension created in the fibres during the winding process.

Figure 6:
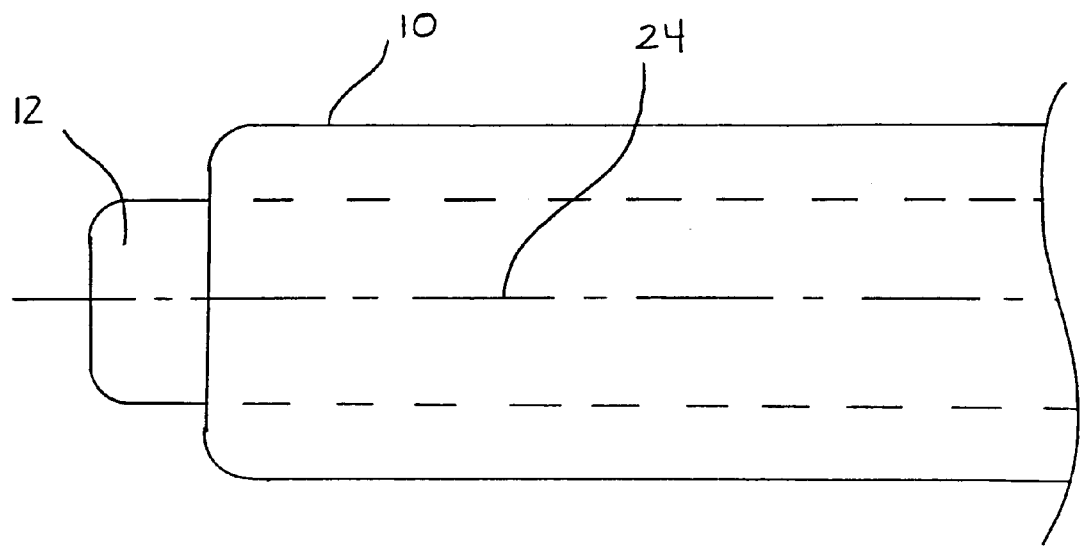
FIG. 6 is a side view of the first embodiment of a polygonal composite structure with the mandrel still in place.

FIG. 3 is a cross sectional view of a composite polygonal beam 10 of the present invention. It is an object of the present invention to overcome the limitations of the prior art. The composite polygonal beam 10 of FIG. 3 comprises a mandrel 12 running lengthwise along the beam 10 and having a longitudinal axis 24 (see FIG. 6), two structural layers 14, and 16, surrounding the mandrel 12, and a plurality of corner pieces 18 equal to the number of sides the beam 10. Each of the plurality of corner pieces 18 is oriented lengthwise along the polygonal beam 10 and is located at each corner 17 of the polygonal beam 10. A corner 17 is defined by the intersection of adjacent sides 13 of the beam 10.

The two structural layers 14, 16 comprise an inner structural layer 14 and an outer structural layer 16, each formed by winding a fibre reinforcement material about the mandrel 12. The fibre reinforcement material has a resin applied thereon and is wound about the mandrel 12 at a winding angle relative to the longitudinal axis 24 (see FIG. 6) of beam 10. The resin is selected from the group consisting of epoxy, polyester, vinylester resin, and combinations thereof. The fibre reinforcement is selected from the group consisting of glass fibre, carbon fibre, synthetic fibres, and combinations thereof Each of the plurality of corner pieces 18 is located between the inner structural layer 14 and outer structural layer 16 such that the placement of the corner pieces 18 actually defines the two structural layers 14, and 16.

The geometric shape of the mandrel 12 defines the geometric shape of the resultant composite beam 10 formed as a result of the winding of fibre reinforcement material about the mandrel 12. When in place, the corner pieces 18 define the shape of each corner such that, upon winding of the fibre reinforcement material about the mandrel 12, placement of the corner pieces 18 enables the forming of a sharper corner and results in a generally uniform wall thickness.

The fibre reinforcement material wound about the mandrel and forming the resultant composite beam 10 is at least a single band of fibre. This single band is formed from at least two or more thinner strands of fibre which are intertwined together and impregnated by a resin. Typically multiple strands are used to form a band of filament. When making a composite beam 10, the band of filament is impregnated with resin and is then wound about the mandrel 12. The number of winding wraps of the band about the mandrel creates a winding pattern. The chosen winding pattern is designed to cover the entire surface uniformly with the fibres.

As is shown by FIGS. 3 and 4, the first embodiment of the polygonal beam 10 is rectangular. The geometric shape of the beam 10 is influenced by the desired structural properties of the beam 10.

FIG. 3 illustrates pressure 20 applied to a composite beam 10 when placed in a pressure mould. The pressure mould applies an evenly distributed pressure 20 such that the composite beam 10 is compressed to predetermined dimensions. The dimensions are influenced by the desired structural strength of the beam 10.

FIG. 4, a cross sectional view of the composite beam 10 having the mandrel removed, shows the resultant shape of the composite beam 10. As is evident from the FIG. 4, there is a generally uniform wall thickness $t_5$ wherein the wall thickness $t_4$ at corner 17 is nearly equivalent to or greater than $t_5$.

Figure 5:
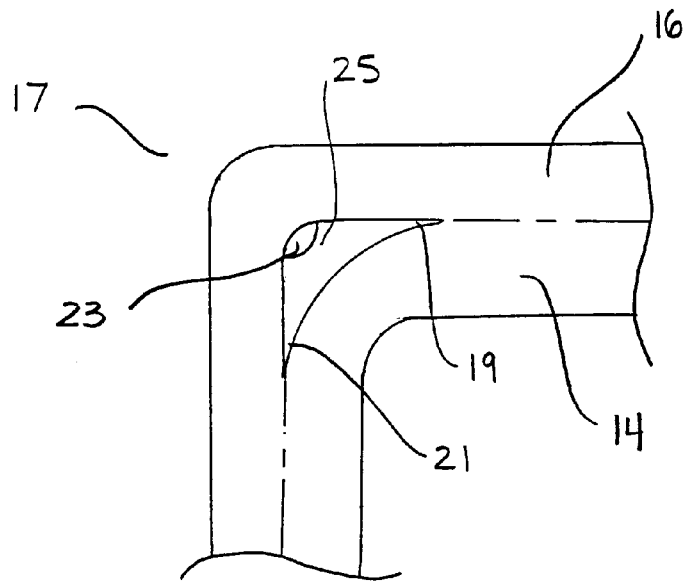
FIG. 5 is an enlarged view of a corner portion of FIG. 4.

FIG. 5 shows an enlarged view of corner 17 of FIG. 4. Each of the corner pieces 18 generally comprises a first arm 19 and a second arm 21. The joint 25 between the first and second arms 19, 21 defines a corner and, in turn, an angle 23. The angle 23 formed by one of the plurality of corner pieces 18 is substantially equivalent to the adjacent interior angle of the mandrel 12. The number of interior angles is directly related to the geometric shape of the mandrel 12.

Moreover, it is evident that the present invention provides a beam having a generally uniform wall thickness in the plate portion of the beam. Further, the corner thickness may be greater than the plate thickness.

Other modifications and alterations may be used in the design and manufacture of the apparatus of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

What is claimed is:

1. A polygonal composite structure formed on a mandrel having a longitudinal axis, said structure comprising:
    two structural layers around the mandrel including an inner structural layer and an outer structural layer;
    a plurality of corner pieces equal to the number of sides of the mandrel;
    wherein each of said plurality of corner pieces is located at each corner of said polygonal composite structure, where each corner is defined by the intersection of adjacent sides;
    wherein each of said plurality of corner pieces is oriented lengthwise along said polygonal composite structure along the length thereof;
    wherein each of said inner structural layer and said outer structural layer is formed by winding a fibre reinforcement material about the mandrel oriented at a winding angle relative to the longitudinal axis, said fibre reinforcement material having a resin applied thereon; and
    wherein each of said plurality of corner pieces is placed at each corner of said composite structure between said inner structural layer and said outer structural layer.

2. The composite structure of claim 1, wherein said composite structure is a beam.

3. The composite structure of claim 1, wherein the geometric shape of the mandrel is substantially the same geometric shape of said composite structure formed on winding of said fibre reinforcement material about the mandrel.

4. The composite structure of claim 1, wherein said fibre reinforcement material wound about the mandrel is a single band of fibre.

5. The composite structure of claim 4, wherein said single band of fibre reinforcement material is formed from at least two thinner strands of fibre which are intertwined together and impregnated by said resin.

6. The composite structure of claim 1, wherein said polygonal composite structure is rectangular.

7. The composite structure of claim 1, wherein said polygonal composite structure is square.

8. The composite structure of claim 1, where said resin is selected from the group consisting of epoxy, polyester, vinylester resin, and combinations thereof.

9. The composite structure of claim 1, where said fibre reinforcement is selected from the group consisting of glass fibre, carbon fibre, synthetic fibres, and combinations thereof.

10. The composite structure of claim 1, wherein each of said plurality of corner pieces comprises a first arm and a second arm, and where the joint of said first arm and said second arm defines a corner and, in turn, an angle.

11. The composite structure of claim 10, wherein said angle of one of said corner pieces is substantially equivalent to the adjacent interior angle of the mandrel.

12. A method of making a polygonal composite structure formed on a mandrel having a longitudinal axis, wherein said composite structure comprises:
    two structural layers around the mandrel including an inner structural layer and an outer structural layer;
    a plurality of corner pieces equal to the number of sides of the mandrel;
    wherein each of said plurality of corner pieces is located at each corner of said polygonal composite structure, where each corner is defined by the intersection of adjacent sides;
    wherein each of said plurality of corner pieces is oriented lengthwise along said polygonal composite structure along the length thereof;
    wherein each of said inner structural layer and said outer structural layer is formed by winding a fibre reinforcement material about the mandrel oriented at a winding angle relative to said longitudinal axis, said fibre reinforcement material having a resin applied thereon; and
    wherein each of said plurality of corner pieces is placed at each corner of said composite structure between said inner structural layer and said outer structural layer;
    said method comprising the steps of:
    (a) providing a mandrel having a winding surface;
    (b) winding a fibre reinforcement material, having a resin applied thereon, about the mandrel so as to form an inner structural layer;
    (c) placing at least one corner piece along an edge of said composite structure at a corner thereof;
    (d) winding said fibre reinforcement about the mandrel, said fibre reinforcement holding said at least one corner piece in the correct position;

(e) repeating steps (c) and (d) until each of said plurality of corner pieces is placed at each respective corner of said composite structure;

(f) winding said fibre reinforcement material, having a resin applied thereon, about the mandrel so as to form an outer structural layer;

(g) curing said applied resin;

wherein each of said plurality of corner pieces is located between said inner structural layer and said outer structural layer.

13. The method of making a composite structure of claim 12, wherein said method further includes the steps of:

(h) placing said composite structure in a pressure mould such that pressure is evenly distributed on all of said composite structure faces;

wherein step (h) follows step (f); and whereby said pressure mould applies an evenly distributed pressure such that said composite structure is compressed to assume pre-determined dimensions.

14. The method of claim 13, further including the step of:

i) removing the mandrel by withdrawing the same away from said composite structure;

wherein step (i) follows step (g).

15. The method of claim 12, further including the step of:

i) removing the mandrel by withdrawing the same away from said composite structure;

wherein step (i) follows step (g).

16. The method of claim 12, wherein the placement of each of said plurality of corner pieces along the length of said composite structure at each of the corners is measured.

17. The method of claim 12, wherein said polygonal composite structure is rectangular.

18. The method of claim 12, wherein said polygonal composite structure is square.

19. The method of claim 12, wherein each of said plurality of corner pieces comprises a first arm and a second arm, and where the joint of said first arm and said second arm defines a corner and, in turn, an angle.

* * * * *